United States Patent
Wang

(10) Patent No.: US 11,212,864 B2
(45) Date of Patent: Dec. 28, 2021

(54) METHOD AND DEVICE FOR PROCESSING NON-MATCHING BETWEEN UE AND NETWORK STATE

(71) Applicant: CHINA ACADEMY OF TELECOMMUNICATIONS TECHNOLOGY, Beijing (CN)

(72) Inventor: Hucheng Wang, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 0 days.

(21) Appl. No.: 16/639,124

(22) PCT Filed: Aug. 3, 2018

(86) PCT No.: PCT/CN2018/098683
§ 371 (c)(1),
(2) Date: Feb. 14, 2020

(87) PCT Pub. No.: WO2019/033945
PCT Pub. Date: Feb. 21, 2019

(65) Prior Publication Data
US 2020/0214072 A1 Jul. 2, 2020

(30) Foreign Application Priority Data

Aug. 14, 2017 (CN) .......................... 201710693914.4
Sep. 20, 2017 (CN) .......................... 201710855403.8

(51) Int. Cl.
*H04W 76/25* (2018.01)
*H04W 76/27* (2018.01)
(Continued)

(52) U.S. Cl.
CPC ............. *H04W 76/25* (2018.02); *H04W 8/08* (2013.01); *H04W 48/16* (2013.01); *H04W 60/00* (2013.01);
(Continued)

(58) Field of Classification Search
None
See application file for complete search history.

(56) References Cited

U.S. PATENT DOCUMENTS

2016/0234877 A1    8/2016    Bangolae et al.
2017/0230869 A1    8/2017    Kubota et al.
(Continued)

FOREIGN PATENT DOCUMENTS

CN    101094096 A    12/2007
CN    102595534 A    7/2012
(Continued)

OTHER PUBLICATIONS

3rd Generation Partnership Project; Technical Specification Group Services and System Aspects; System Architecture for the 5G System; Stage 2 (Release 15); 3GPP TS 23.501 V1.12.0 (Jul. 2017).
(Continued)

*Primary Examiner* — Kodzovi Acolatse
*Assistant Examiner* — The Hy Nguyen
(74) *Attorney, Agent, or Firm* — Kilpatrick Townsend & Stockton, LLP

(57) ABSTRACT

Disclosed are a method and device for processing non-matching between a UE unit and a network state applicable to an access and mobility management (AMF) function. The method comprises: upon receiving a non-access stratum message transmitted by a UE unit or an N2 interface message transmitted by a radio access network (RAN) node, determining that the UE unit is in a connected state at a network side; and if it is determined that a change occurs in
(Continued)

a RAN node serving the UE unit, notifying said RAN node that a context of the UE unit and an existing user plane connection are to be released. The invention solves technical problems in the prior art of inefficient use of an air interface resource and packet loss, thereby reducing paging overheads and packet loss.

14 Claims, 4 Drawing Sheets

(51) Int. Cl.

| | | |
|---|---|---|
| *H04W 8/08* | (2009.01) | |
| *H04W 48/16* | (2009.01) | |
| *H04W 60/00* | (2009.01) | |
| *H04W 68/00* | (2009.01) | |
| *H04W 80/10* | (2009.01) | |

(52) U.S. Cl.
CPC ......... *H04W 68/005* (2013.01); *H04W 76/27* (2018.02); *H04W 80/10* (2013.01)

(56) References Cited

U.S. PATENT DOCUMENTS

| | | | |
|---|---|---|---|
| 2018/0132210 A1* | 5/2018 | Rico Alvarino | H04W 52/0206 |
| 2018/0324646 A1* | 11/2018 | Lee | H04W 36/0016 |
| 2019/0239280 A1* | 8/2019 | Li | H04W 76/34 |
| 2020/0077356 A1* | 3/2020 | Youn | H04W 8/065 |
| 2020/0120570 A1* | 4/2020 | Youn | H04W 36/0033 |
| 2020/0145817 A1* | 5/2020 | Liu | H04W 12/037 |
| 2020/0145954 A1* | 5/2020 | Wang | H04W 52/0258 |
| 2020/0163149 A1* | 5/2020 | Mildh | H04W 76/27 |

FOREIGN PATENT DOCUMENTS

| | | |
|---|---|---|
| CN | 106658758 A | 5/2017 |
| EP | 2557890 A1 | 2/2013 |
| WO | 2016070936 A1 | 5/2016 |
| WO | 2017134939 A1 | 8/2017 |

OTHER PUBLICATIONS

3rd Generation Partnership Project; Technical Specification Group Radio Access Network; NR; NR and NG-RAN Overall Description; Stage 2 (Release 15); 3GPP TS 38.300 V0.6.0 (Aug. 2017).

3rd Generation Partnership Project;Technical Specification Group Services and System Aspects;Study of system level impacts due to introduction of light connection for LTE in EPS (Release 15), total 36 pages, Jun. 2017, 3GPP TR 23. 723 V0.2.0.

Huawei et al.,"Update to procedures to support UE location change notification",3GPP TSG SA WG2 Meeting #122, Jun. 26-Jun. 30, 2017, San Jose Del Cabo, Mexico, total 13 pages, S2-174329.

Qualcomm Incorporate, "Light Connection Model Analysis", 3GPP TSG-RAN WG3 Meeting #94, Reno, USA, Nov. 14-18, 2016, total 7 pages, R3-162833.

LG Electronics et al., "TS 23.502 Paging handling in Non-allowed area", SA WG2 Meeting #122, Jun. 26-30, 2017, San Jose Del Cabo, Mexico, total 10 pages, S2-175295.

Huawei et al.,"Inter-RAT mobility for inactive UE," 3GPP TSG-RAN WG2 Meeting #99, Berlin, Germany, Aug. 21-25, 2017, total 5 pages, R2-1708713.

Ericsson,"RRC Inactive state—new procedures in TS 23.502", SA WG2 Meeting #122, Jun. 26-30, 2017, San Jose Del Cabo, Mexico, total 19 pages, S2-174808.

CATT,"TS 23.502: PDU session deactivation due to mobility restriction", SA WG2 Meeting #122, Jun. 26-30, 2017, San Jose Del Cabo, Mexico, total 12 pages, S2-175095.

\* cited by examiner

METHOD AND DEVICE FOR PROCESSING NON-MATCHING BETWEEN UE AND NETWORK STATE

The present application is a US National Stage of International Application No. PCT/CN2018/098683, filed Aug. 3, 2018, which claims the priority from Chinese Patent Application No. 201710693914.4, filed with the Chinese Patent Office on Aug. 14, 2017 and entitled "Method and Device for Processing Non-Matching Between UE and Network State", and claims the priority from Chinese Patent Application No. 201710855403.8, filed with the Chinese Patent Office on Sep. 20, 2017 and entitled "Method and Device for Processing Non-Matching Between UE and Network State", which are hereby incorporated by reference in their entirety.

FIELD

The invention relates to the field of communication technology, and particularly to a method and a device for processing the mismatch between the UE and the network state.

BACKGROUND

At present, 3GPP (3rd Generation Partnership Project) has determined the architecture reference module of the 5G (The Fifth Generation Mobile Network) network. For this architecture, the 3GPP has introduced a new RRC (Radio Resource Control) state, i.e., RRC inactive (RRC inactive state). When a UE (User Equipment) is in this state, the RRC connection between the RAN (Radio Access Network) node and the UE has been released, but the Nx interface connection remains.

Since the RRC inactive state is expected to be transparent to the core network, that is, the core network still thinks that the UE is always in the connected state, the RAN node will receive the downlink signaling or data of the UE in this state, and in this way the RAN node needs to page the UE, i.e., RAN level paging.

In order to support the RAN level paging, the RAN node needs to support the RAN level paging area update, that is, the RAN node allocates a paging area to the UE in the RRC inactive state. When the UE moves out of the paging area, the UE needs to initiate the paging area update process, and the RAN node allocates a new paging area to the UE. When the RAN anchor node that currently serves the UE changes due to the movement of the UE, it is necessary to perform the context transmission between the RAN anchor nodes and update the N2 interface connection (the N2 interface is the interface between RAN and AMF) to the core network.

In addition, in order to support the RAN level paging area update, the AMF (Access and Mobility Management Function) needs to provide the auxiliary information (e.g., registration area, allowed DRX (allowed discontinuous reception), etc.) to the RAN anchor node, wherein the registration area is used to ensure that the RAN level paging area is in the range of the registration area when it is allocated.

Moreover, in the AMF, the connection management states of the UE are divided into CM-IDLE (idle state) and CM-CONNECTED (connected state). After the interface connection between the RAN and the AMF is released, the AMF considers that the UE enters the CM-IDLE state, otherwise the AMF considers that the UE is always in the connected state.

Specifically, after the 5G RAN activates the RRC inactive state for the UE, the RAN anchor receives the downlink data and pages the UE. At this time, if the UE moves out of the current RAN Paging area and enters the coverage of another RAN node that does not support the RRC inactive state, the UE cannot remain in the RRC inactive state, and cannot receive the RAN level paging of the old RAN anchor node either. In this way, the old RAN anchor node will not get the paging response of the UE and fail after repeating the RAN level paging many times, which will increase the paging overhead and thus cause the air interface resource waste and packet loss.

It can be seen that there are technical problems of air interface resource waste and packet loss in the prior art.

SUMMARY

The embodiments of the invention provide a method and a device for processing the mismatch of the UE and the network state, so as to solve the technical problems of air interface resource waste and packet loss in the prior art, and reduce the paging overhead and packet loss.

In one aspect, an embodiment of the invention provides a method for processing the mismatch of the User Equipment (UE) and the network state, which is applied to the Access and Mobility Management Function (AMF) and includes: receiving a Non-Access Stratum (NAS) message sent by the UE or an N2 interface message sent by a Radio Access Network (RAN) node; determining that the UE is in a connected state at a network side; determining that an RAN node serving the UE has changed, and notifying the old RAN node to release the UE context and an existing user plane connection(s) for the UE.

Optionally, receiving the NAS message sent by the UE, includes: receiving an initial NAS message sent by the UE in an idle state, wherein the idle state is a connection management idle state entered by UE NAS layer after the UE enters a Radio Resource Control (RRC) idle state from an RRC inactive state.

Optionally, receiving the initial NAS message sent by the UE in the idle state, includes: receiving a registration update request message sent by the UE in the idle state; or receiving a request message of the UE when the UE sends uplink data in the idle state.

Optionally, determining that the UE is in the connected state at the network side, includes: determining that the UE is in the connected state at the network side according to the UE context stored.

Optionally, notifying the old RAN node to release the UE context and user plane connection, includes: notifying the old RAN node to release the UE context; and deleting the user plane connection to a core network.

Optionally, the method further includes: notifying the old RAN node to release the UE context so that the old RAN node stops RAN level paging.

Optionally, determining that the RAN node serving the UE has changed, includes: determining that the RAN node serving the UE has changed when determining that the RAN node forwarding the NAS message or the RAN node sending the N2 interface message is different from an RAN node stored in the UE context.

Optionally, the determining that the RAN node serving the UE has changed, and notifying the old RAN node to release the UE context and user plane connection, further includes: requesting a Session Management Function (SMF) to deactivate a Protocol Data Unit session (PDU session), where the request is used to request the SMF to deactivate the user plane connection so that the SMF deletes user plane configuration of the PDU session.

Optionally, after receiving the NAS message sent by the UE or the N2 interface message sent by an RAN node, the method further includes: determining that the UE enters a non-allowed area or forbidden area, and notifying an SMF serving a Protocol Data Unit session (PDU session) with user plane connection that only regulatory prioritized services is reachable.

Optionally, when a service request message of the UE is received, the method further includes: requesting an SMF to deactivate a Protocol Data Unit session (PDU session) and then reactivate the PDU session according to the PDU session specified in the service request message.

In another aspect, an embodiment of the invention provides a device for processing the mismatch of the UE and the network state, which is applied to the Access and Mobility Management Function (AMF) and includes: a first determining module configured to receive a NAS message sent by the UE or an N2 interface message sent by a Radio Access Network (RAN) node, and determine that the UE is in a connected state at a network side; and a second determining module configured to determine that an RAN node serving the UE has changed, and notify the old RAN node to release the UE context and an existing user plane connection(s) for the UE.

Optionally, the device further includes a receiving module configured to: receive an initial NAS message sent by the UE in an idle state, wherein the idle state is a connection management idle state entered by UE NAS layer after the UE enters a Radio Resource Control (RRC) idle state from an RRC inactive state, and then the initial NAS message is sent.

Optionally, the receiving module is configured to: receive a registration update request message sent by the UE in the idle state; or receive a request message of the UE when the UE sends uplink data in the idle state.

Optionally, the first determining module is configured to: determine that the UE is in the connected state at the network side according to the UE context stored.

Optionally, the second determining module is configured to: notify the old RAN node to release the UE context; and delete the user plane connection to a core network.

Optionally, the second determining module is further configured to: notify the old RAN node to release the UE context so that the old RAN node stops RAN level paging.

Optionally, the second determining module is configured to: determine that the RAN node serving the UE has changed when determining that the RAN node forwarding the NAS message or the RAN node sending the N2 interface message is different from an RAN node stored in the UE context.

Optionally, the second determining module is further configured to: request a Session Management Function (SMF) to deactivate a Protocol Data Unit session (PDU session), where the request is used to request the SMF to deactivate the user plane connection so that the SMF deletes user plane configuration for the PDU session.

Optionally, after receiving the NAS message sent by the UE or the N2 interface message sent by an RAN node, the device further includes a third determining module configured to: determine that the UE enters a non-allowed area or forbidden area, and notify a Session Management Function (SMF) serving a Protocol Data Unit session (PDU session) with user plane connection that only regulatory prioritized services is reachable.

Optionally, when a service request message of the UE is received, the device further includes: a requesting module configured to request an SMF to deactivate a Protocol Data Unit session (PDU session), and then reactivate the PDU session according to the PDU session specified in the service request message.

In another aspect, an embodiment of the invention provides a computer device including a memory, a processor and a computer program that is stored on the memory and run on the processor, where the processor implements the method for processing the mismatch of the UE and the network state described above when executing the computer program.

In another aspect, an embodiment of the invention provides a computer readable storage medium storing a computer program thereon, where the computer program, when executed by a processor, implements the method for processing the mismatch of the UE and the network state described above.

The one or more above technical solutions in the embodiments of the invention have at least one or more technical effects as follows.

In the technical solutions of the embodiments of the invention, it is determined that the UE is in the connected state at the network side after receiving the NAS message sent by the UE or the N2 interface message sent by the Radio Access Network (RAN) node; it is determined that the RAN node serving the UE has changed, and the old RAN node is notified to release the UE context and the existing user plane connection(s) for the UE. That is, when it is determined that the UE mismatches with the network state of the RAN node that currently serves the UE, the old RAN node is notified to release the UE context and the existing user plane connection(s) for the UE, thereby solving the technical problems of air interface resource waste and packet loss, and reducing the paging overhead and packet loss.

BRIEF DESCRIPTION OF THE DRAWINGS

In order to illustrate the technical solutions in the embodiments of the invention or in the prior art more clearly, the accompanying figures which need to be used in describing the embodiments will be introduced below briefly. Obviously the accompanying figures described below are only some embodiments of the invention.

DETAILED DESCRIPTION

The embodiments of the invention provide a method and a device for processing the mismatch of the UE and the network state, so as to solve the technical problems of air interface resource waste and packet loss in the prior art, and reduce the paging overhead and packet loss.

In order to solve the above technical problem, the general idea of the technical solution in the embodiments of the invention is as follows.

A method for processing the mismatch of the User Equipment (UE) and the network state is applied to the Access and Mobility Management Function (AMF) and includes: receiving the NAS message sent by the UE or the N2 interface message sent by a Radio Access Network (RAN) node; determining that the UE is in the connected state at the network side; and determining that the RAN node serving the UE has changed, and notifying the old RAN node to release the UE context and the existing user plane connection(s) for the UE.

In the technical solutions of the embodiments of the invention, it is determined that the UE is in the connected state at the network side after receiving the NAS message sent by the UE or the N2 interface message sent by the Radio Access Network (RAN) node; it is determined that the RAN node serving the UE has changed, and the old RAN node is notified to release the UE context and the existing user plane connection(s) for the UE. That is, when it is determined that the UE mismatches with the network state of the RAN node that currently serves the UE, the old RAN node is notified to release the UE context and the existing user plane connection(s) for the UE, thereby solving the technical problems of air interface resource waste and packet loss, and reducing the paging overhead and packet loss.

The term "and/or" herein is simply an association relationship describing the associated objects, indicating that there may be three relationships, for example, A and/or B may represent: only A, both A and B, and only B. Furthermore, the character "/" herein generally indicates the "or" relationship of the front and back associated objects without special illustration.

In order for the better understanding of the above technical solutions, the technical solutions of the invention will be illustrated below in details by way of the drawings and specific embodiments, and it should be understood that the embodiments of the invention and the specific features in the embodiments are intended to illustrate the technical solutions of the invention in details but not limit the technical solutions of the invention, and the embodiments of the invention and the specific features in the embodiments can be combined with each other without collision.

First Embodiment

Figure 1:
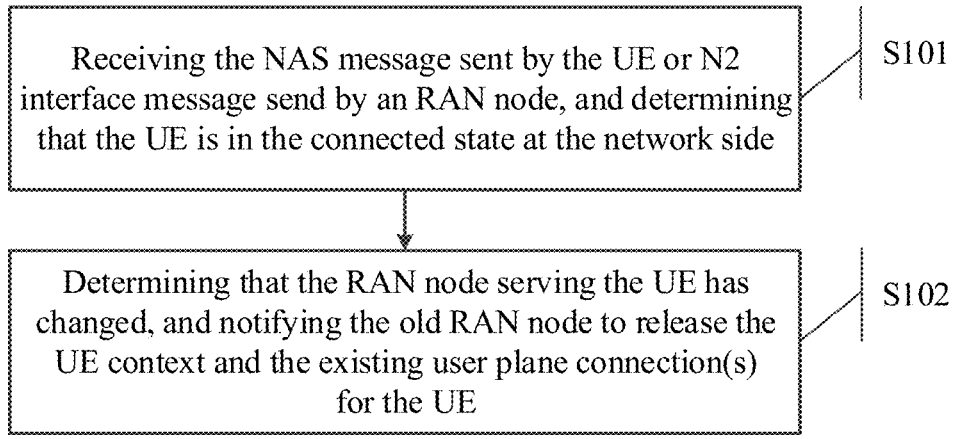
FIG. 1 is a flowchart of a method for processing the mismatch of the UE and the network state according to a first embodiment of the invention.

Referring to FIG. 1, the first embodiment of the invention provides a method for processing the mismatch of the User Equipment (UE) and the network state, which is applied to the Access and Mobility Management Function (AMF) and includes the following steps.

S101: receiving the NAS message sent by the UE or the N2 interface message sent by a Radio Access Network (RAN) node, and determining that the UE is in the connected state at the network side.

S102: determining that the RAN node serving the UE has changed, and notifying the old RAN node to release the UE context and the existing user plane connection(s) for the UE.

In an embodiment of the invention, the specific implementation process of the steps S101-S102 is as follows.

In a specific implementation process, the NAS message received by the AMF and sent by the UE may be a registration update message, a service request message, and so on. In an embodiment of the invention, the step of receiving the NAS message sent by the UE includes: receiving the initial NAS message sent by the UE in the idle state, wherein the idle state is the connection management idle state entered by UE NAS layer after the UE enters the Radio Resource Control (RRC) idle state from the RRC inactive state. For example, after the 5G RAN activates the RRC inactive state for the UE, the RAN anchor node receives the downlink data and pages the UE. When the UE moves out of the current RAN Paging area and enters the coverage area of another RAN node that does not support the RRC inactive state, the UE cannot remain in the RRC inactive state, and the UE switches from the current connection management connected state to the connection management idle state.

In an embodiment of the invention, the initial NAS message may be the registration update message, the service request message, and so on. Therefore, in a specific implementation process, the step of receiving the initial NAS message sent by the UE in the idle state may include but not limited to two cases as follows.

First Case

The first case is: receiving the registration update request message sent by the UE in the idle state; for example, when the UE leaves the paging area of the current RAN node and enters the coverage area of another RAN node that does not support the RRC inactive state, the UE sends the registration update request message directly to the AMF.

Second Case

The second case is: receiving the request message of the UE when the UE sends the uplink data in the idle state. For example, when the UE leaves the paging area of the current RAN node and enters the coverage area of another RAN node that does not support the RRC inactive state, and when the UE has the uplink data to be sent, the UE needs to further judge whether the current movement moves out of the registration area allocated for the current RAN node. Further, if not, the UE initiates the service request process. That is, when the UE sends the uplink data in the idle state, the request message of the UE is received, where the request message may be a service request message.

In a specific implementation process, when the UE enters the RRC idle state but the UE does not move out of the current registration area, the UE only initiates the RAN level position update process and does not initiate any NAS process. After the RAN node receives the RAN level position update request of the UE, the RAN node determines that it cannot to activate the RRC inactive state for the UE, the RAN node initiates the N2 release process to the AMF of the core network.

In a specific implementation process, since the core network considers that the UE is always in the connected state, that is, when it is determined that the UE is in the connected state at the network side, the old RAN node receives the downlink signaling or data of the UE in this state, the old RAN node needs to page the UE at this time.

In a specific implementation process, when it is determined that the UE is in the connected state at the network side, it is further determined whether the RAN node serving the UE has changed. Once it is determined that the RAN node serving the UE has changed, the old RAN node is notified to release the UE context and the existing user plane connection(s) for the UE, wherein the UE context includes the mobility context and the session connection context. Thus, the old RAN node will no longer page the UE, thereby reducing the paging overhead.

In an embodiment of the invention, the step of determining that the RAN node serving the UE has changed includes: determining that the RAN node serving the UE has changed when determining that the RAN node forwarding the NAS message or the RAN node sending the N2 interface message is different from the RAN node stored in the UE context.

Figure 2:
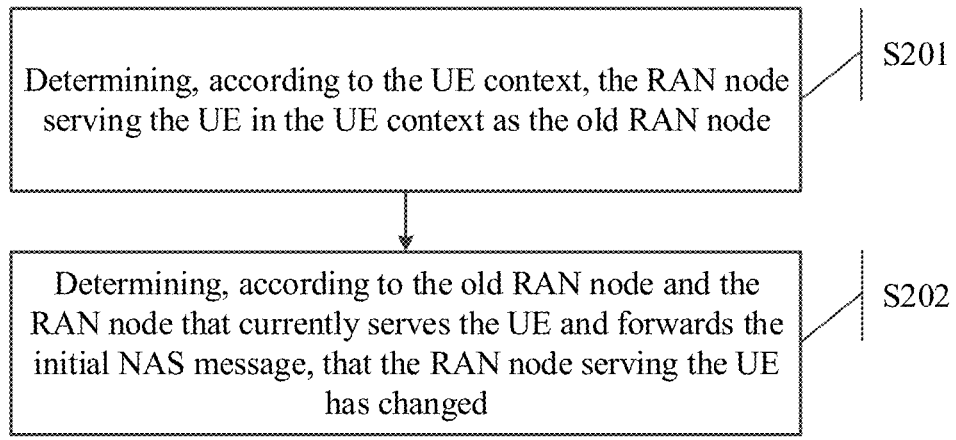
FIG. 2 is a flowchart of determining that the RAN node serving the UE has changed in step S102 in the method for processing the mismatch of the UE and the network state according to the first embodiment of the invention.

In an embodiment of the invention, in the scheme of determining that the UE is in the connected state at the network side and then determining that the RAN node serving the UE has changed by receiving the NAS message sent by the UE, referring to FIG. 2, determining that the RAN node serving the UE has changed in step S102 includes the following steps.

S201: determining, according to the UE context, the RAN node serving the UE stored in the UE context as the old RAN node.

S202: determining, according to the old RAN node and the RAN node that currently serves the UE and forwards the initial NAS message, that the RAN node serving the UE has changed.

The specific implementation process of the steps S201-S202 means that it is determined that the RAN node serving the UE has changed when it is determined that the RAN node that forwards the NAS message is different from the RAN node stored in the UE context.

In an embodiment of the invention, in the scheme of determining that the UE is in the connected state at the network side and determining that the RAN node serving the UE has changed by receiving the N2 interface message sent by the RAN node, the specific implementation process of the step of determining that the RAN node serving the UE has changed is: determining that the RAN node serving the UE has changed when determining that the RAN node sending the N2 interface message is different from the RAN node stored in the UE context.

In a specific implementation process, after the AMF receives the N2 interface release message sent by the RAN node that currently serves the UE, the AMF determines that the UE is currently in the connected state at the network side and that the RAN node serving the UE that is recorded in the UE context stored by itself is different from the RAN node that currently serves the UE, then the AMF requests the old RAN node, i.e., the RAN node serving the UE recorded in the UE context, to release the UE context and the possible user plane connection(s).

Of course, it is also possible for those skilled in the art to design different schemes to determine whether the RAN node serving the UE has changed according to the actual demands, which will not be described in detail here.

In an embodiment of the invention, the specific implementation process of the step of determining that the UE is in the connected state at the network side may be: determining that the UE is in the connected state at the network side according to the UE context.

Figure 3:
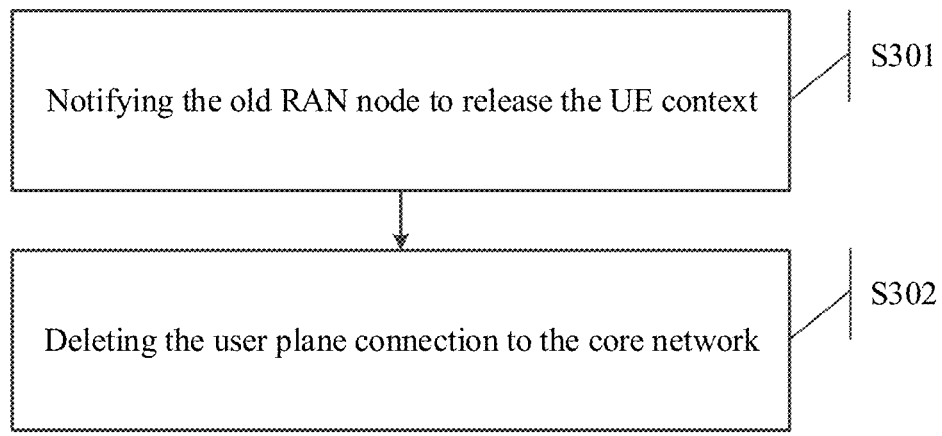
FIG. 3 is a flowchart of notifying the old RAN node to release the UE context and the user plane connection in step S102 in the method for processing the mismatch of the UE and the network state according to the first embodiment of the invention.

In an embodiment of the invention, referring to FIG. 3, notifying the old RAN node to release the UE context and the user plane connection in step S102 includes the following steps.

S301: notifying the old RAN node to release the UE context.

S302: deleting the user plane connection to the core network.

Here, in step S301, the old RAN node is notified to release the UE context, so that the old RAN node stops the RAN level paging, that is, the AMF controls the old RAN node to stop paging the UE.

In an embodiment of the invention, the step S102 of determining that the RAN node serving the UE has changed and notifying the old RAN node to release the UE context and the user plane connection further includes:

requesting the SMF to deactivate the Protocol Data Unit session (PDU session) when determining that the RAN node serving the UE has changed and notifying the old RAN node to release the UE context and the user plane connection, where the request is used to request the SMF to deactivate the user plane connection so that the SMF deletes the user plane configuration for the PDU session.

Figure 4:
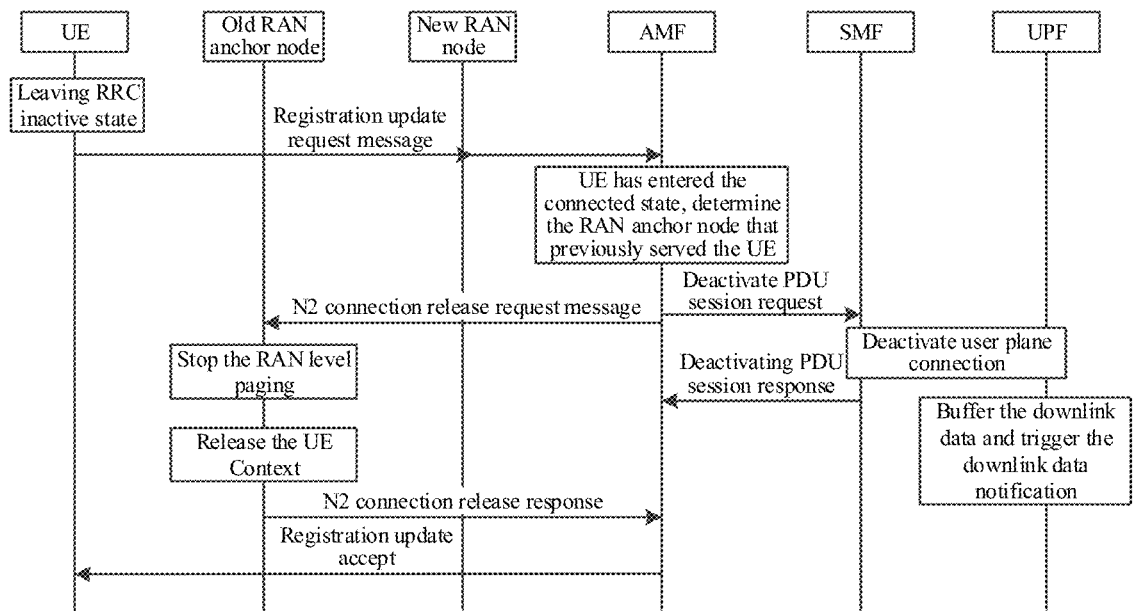
FIG. 4 is a schematic diagram of the process when the initial NAS message in the first case in the method for processing the mismatch of the UE and the network state according to the first embodiment of the invention.

In an embodiment of the invention, when the registration update request message sent by the UE in the idle state is received in the above first case, the specific implementation process of the method for processing the mismatch between the UE and the network state is as shown in FIG. 4. Specifically, when the UE leaves the paging response area of the current RAN node and enters the coverage area of another RAN node that does not support the RRC inactive, the UE sends the registration update request message to the AMF. After receiving the registration update request message, the AMF searches for the UE context. When the AMF determines that the UE is currently in the connected state and the RAN anchor node serving the UE changes from the old RAN anchor node to a new RAN node, the AMF sends the N2 connection release request message to the RAN anchor node that previously served the UE (i.e., the old RAN anchor node) in the context, to request to release the N2 connection between this RAN anchor node and the AMF.

The AMF sends the deactivate PDU session request to the SMF at the same time or after receiving the N2 connection release response message returned from the RAN anchor node that previously served the UE, to request the SMF to deactivate the user plane connection. When the RAN anchor node that previously served the UE receives the N2 connection release request, and when the RAN anchor node is performing the RAN level paging, the RAN level paging is stopped, and the RAN anchor node that previously served the UE releases the UE context. After receiving the deactivate PDU session request, the SMF configures the UPF (User Plane Function) to delete the user plane tunnel. When the UPF is transmitting the data at this time, the UPF buffers the downlink data and triggers the downlink data notification process. The AMF returns the registration update accept message to the UE after receiving the responses from the RAN anchor node that previously served the UE and the SMF.

When the AMF receives the NAS message sent by the UE or the N2 interface message sent by the RAN node, when the AMF determines that the UE has entered the non-allowed area or forbidden area at this time, the AMF notifies the SMF serving the PDU session that the UE only receives the regulatory prioritized services for the PDU session with user plane connection. Here, the non-allowed area, the forbidden area, and the regulatory prioritized services are the terms defined in the 3GPP TS 23.501 protocol, where the regulatory prioritized services may be the emergency call service and the like. In a specific implementation process, the AMF may further determine that there is a PDU session of the user plane connection according to the PDU session deleted by the RAN anchor node that previously served the UE. The RAN anchor node that previously served the UE may indicate the deleted PDU session in the N2 connection release response message, thereby ensuring that the AMF notifies the RAN anchor node that previously served the UE to release the existing user plane connection(s) for the UE.

Figure 5:
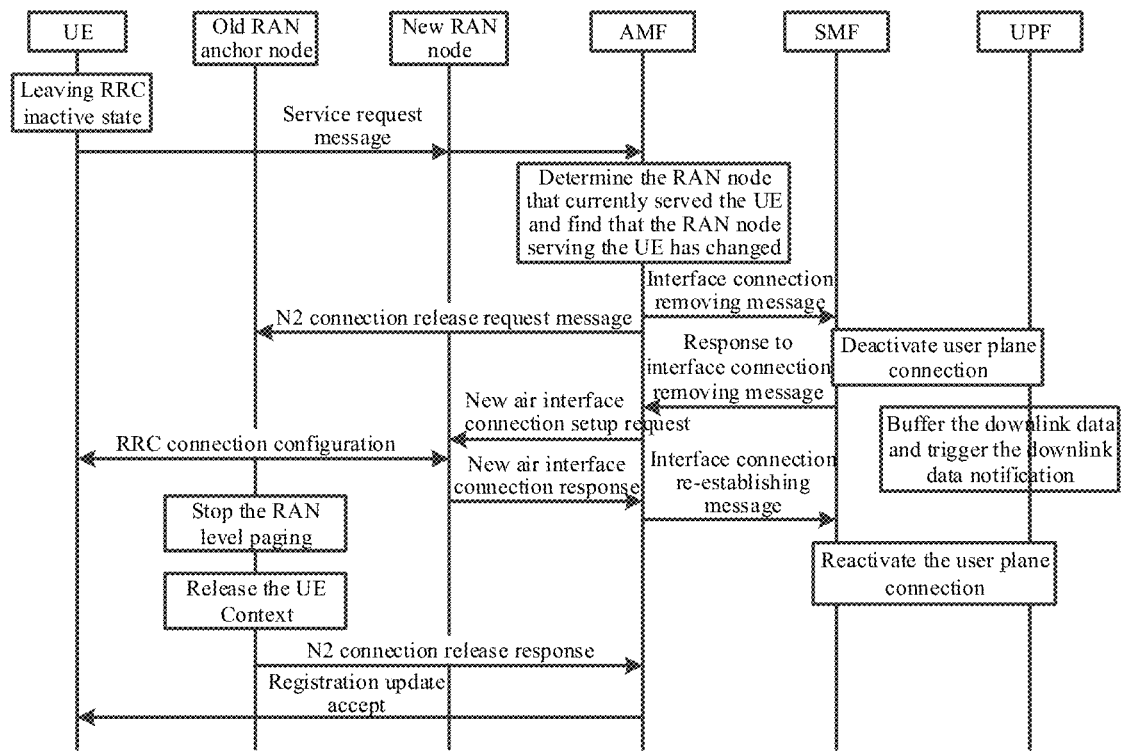
FIG. 5 is a schematic diagram of the process when the initial NAS message in the second case in the method for processing the mismatch of the UE and the network state according to the first embodiment of the invention.

In an embodiment of the invention, in the above second case, that is, when the UE sends the uplink data in the idle state and the AMF receives the request message of the UE, the specific implementation process of the method for processing the mismatch of the UE and the network state is as shown in FIG. 5. Specifically, when the UE leaves the paging response area of the current RAN node and enters the coverage area of another RAN node that does not support the RRC inactive, the UE judges whether it has moved out of the registration area allocated for the current RAN node if there is the uplink data to be sent. If not, the service request process is initiated, otherwise the registration update process which carries the active flag is initiated.

After the AMF receives the request message of the UE when UE sending the uplink data in the idle state, the AMF searches the UE context. If the AMF determines that the current UE has already been in the connected state and the RAN node serving the UE has changed, the AMF sends the N2 connection release request message to the RAN anchor node that previously served the UE (i.e., the old RAN anchor node) in the context, to request to release the N2 connection between the RAN anchor node and the AMF. When receiving the N2 connection release request message, the RAN anchor node that previously served the UE stops the RAN level paging if it is currently performing the RAN level paging, and this RAN anchor node releases the UE context. At the same time, the AMF sends the interface message to the SMF. After receiving the interface message, the SMF finds that the user plane connection of the current PDU session is active, then firstly requests the UPF to deactivate the user plane connection. If the UPF is performing the data transmission at this time, the UPF buffers the downlink data and triggers the Downlink Data Notification process. The SMF receives the Downlink Data Notification of the UPF and suspends this process.

In an embodiment of the invention, if the service request message of the UE is received, the method further includes: requesting the Session Management Function (SMF) to deactivate the PDU session; and then reactivate the PDU session according to the PDU session specified in the service request message.

In a specific implementation process, when the UE mismatches with the network state, the SMF is requested to deactivate the PDU session according to the PDU session specified in the service request message. Since the RAN node that currently serves the UE has changed, the AMF requests the new RAN node to establish the air interface connection for the UE, and forwards the downlink tunnel information allocated by the RAN node to the PDU session to the SMF. After receiving the downlink tunnel information, the SMF performs the user plane configuration and reactivates a new user plane tunnel. In addition, the new RAN node configures the RRC connection for the UE.

Second Embodiment

Figure 6:
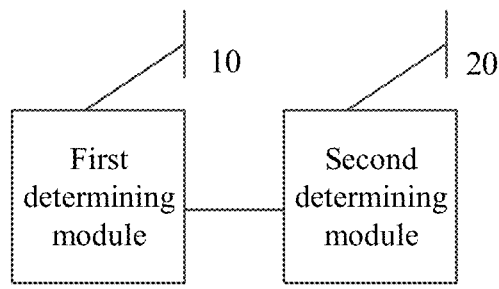
FIG. 6 is a schematic structural diagram of a device for processing the mismatch of the UE and the network state according to a second embodiment of the invention.

Based upon the same inventive concept as the first embodiment of the invention, referring to FIG. 6, the second embodiment of the invention further provides a device for processing the mismatch of the User Equipment (UE) and the network state, which is applied to the Access and Mobility Management Function (AMF) and includes:

a first determining module 10 configured to determine that the UE is in the connected state at the network side when receiving the NAS message sent by the UE or the N2 interface message sent by a Radio Access Network (RAN) node;

a second determining module 20 configured to determine that the RAN node serving the UE has changed, and notifying the old RAN node to release the UE context and the existing user plane connection(s) for the UE.

In an embodiment of the invention, the device further includes a receiving module configured to: receive the initial NAS message sent by the UE in the idle state, wherein the idle state is the connection management idle state entered by UE NAS layer after the UE enters the Radio Resource Control (RRC) idle state from the RRC inactive state.

In an embodiment of the invention, the receiving module is configured to: receive the registration update request message sent by the UE in the idle state; or receive the request message of the UE when the UE sends the uplink data in the idle state.

In an embodiment of the invention, the first determining module 10 is configured to: determine that the UE is in the connected state at the network side according to the UE context.

In an embodiment of the invention, the second determining module 20 is configured to: determine the RAN node serving the UE stored in the context as the old RAN node according to the UE context; and determine that the RAN node serving the UE has changed according to the old RAN node and the RAN node that currently serves the UE and forwards the initial NAS message.

In an embodiment of the invention, the second determining module 20 is configured to: notify the old RAN node to release the UE context; and delete the user plane connection to the core network.

In an embodiment of the invention, the second determining module 20 is further configured to: notify the old RAN node to release the UE context so that the old RAN node stops the RAN level paging.

In an embodiment of the invention, the second determining module 20 is configured to: determine that the RAN node serving the UE has changed when determining that the RAN node forwarding the NAS message or the RAN node sending the N2 interface message is different from the RAN node stored in the UE context.

In an embodiment of the invention, the second determining module 20 is further configured to: request the Session Management Function (SMF) to deactivate the Protocol Data Unit session (PDU session), where the request is used to request the SMF to deactivate the user plane connection so that the SMF deletes the user plane configuration for the PDU session.

In an embodiment of the invention, after receiving the NAS message sent by the UE or the N2 interface message sent by the RAN node, the device further includes a third determining module configured to: determine that the UE enters the non-allowed area or forbidden area, and notify the SMF serving the Protocol Data Unit session (PDU session) with the user plane connection that the UE only receives the regulatory prioritized services.

In an embodiment of the invention, when the service request message of the UE is received, the device further includes: a requesting module configured to request the Session Management Function (SMF) to deactivate the Protocol Data Unit session (PDU session), and then reactivate the PDU session according to the PDU session specified in the service request message.

In the embodiments of the invention, the working principle of the device for processing the mismatch of the UE and the network state is the same as that of the method for processing the mismatch of the UE and the network state described above, and the detailed description thereof will be omitted here.

Figure 7:
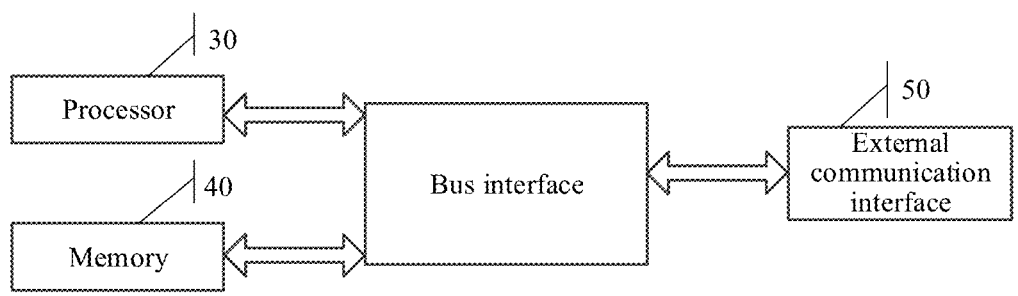
FIG. 7 is a schematic diagram of a device for processing the mismatch of the UE and the network state according to an embodiment of the invention.

Based upon the same inventive concept as the method, referring to FIG. 7, the invention further provides a device for processing the mismatch of the UE and the network state, which includes a processor 30, a memory 40, and an external communication interface 50; wherein the external communication interface 50 is configured to receive and send the data under the control of the processor 30.

The processor 30 is configured to read the programs in the memory 40 to perform the process of:

determining that the UE is in the connected state at the network side after the external communication interface 50 receives the NAS message sent by the UE or the N2 interface message sent by an RAN node;

determining that the RAN node serving the UE has changed, and notifying the old RAN node to release the UE context and the existing user plane connection(s) for the UE.

Here, in FIG. 7, the bus architecture may include any numbers of interconnected buses and bridges, and specifically link various circuits of one or more processors represented by the processor 30 and the memory represented by the memory 40. The bus architecture may further link various other circuits such as peripheral device, voltage regulator and power management circuit, which are all well known in the art and thus will not be further described again herein. The bus interface provides an interface. The external communication interface 50 may be a plurality of elements, and provide the units for communicating with various other devices over the transmission media. The processor 30 is responsible for managing the bus architecture and general processing, and the memory 40 may store the data used by the processor 30 when performing the operations.

Another aspect of an embodiment of the invention provides a computer device. In a specific implementation process, the computer device can specifically be a network side device or a user equipment, and include a memory, a processor and a computer program that is stored on the memory and can run on the processor. The processor implements the methods of all the aspects described above when executing the computer program.

Another aspect of an embodiment of the invention provides a computer readable storage medium storing a computer program thereon, where the computer program, when executed by a processor, implements the methods of all the aspects described above.

The one or more above-mentioned technical solutions in the embodiments of the invention have at least one or more technical effects as follows.

In the technical solutions of the embodiments of the invention, it is determined that the UE is in the connected state at the network side when receiving the NAS message sent by the UE or the N2 interface message sent by the RAN node; it is determined that the RAN node serving the UE has changed, and the old RAN node is notified to release the UE context and the existing user plane connection(s) for the UE. That is, when it is determined that the UE mismatches with the network state of the RAN node that currently serves the UE, the old RAN node is notified to release the UE context and the existing user plane connection(s) for the UE, thereby solving the technical problems of air interface resource waste and packet loss, and reducing the paging overhead and packet loss.

It should be understood by those skilled in the art that the embodiments of the invention can provide methods, systems and computer program products. Thus the invention can take the form of hardware embodiments alone, software embodiments alone, or embodiments combining the software and hardware aspects. Also the invention can take the form of computer program products implemented on one or more computer usable storage mediums (including but not limited to magnetic disk memories, optical memories and the like) containing computer usable program codes therein.

The invention is described by reference to the flow charts and/or the block diagrams of the methods, the devices (systems) and the computer program products according to the embodiments of the invention. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

Although the embodiments of the invention have been described, those skilled in the art can make additional alterations and modifications to these embodiments once they learn about the basic creative concepts. Thus the attached claims are intended to be interpreted to include the embodiments as well as all the alterations and modifications falling within the scope of the invention.

Evidently those skilled in the art can make various modifications and variations to the invention without departing from the spirit and scope of the invention. Thus the invention is also intended to encompass these modifications and variations therein as long as these modifications and variations come into the scope of the claims of the invention and their equivalents.

What is claimed is:

1. A method for processing status mismatch between a User Equipment, UE, and a network, applied to an Access and Mobility Management Function, AMF, the method comprises:

receiving an initial non-access stratum, NAS, message sent by the UE in a Connection Management idle state, or receiving an N2 interface message, sent by a first Radio Access Network, RAN, node, and configured to forward the initial NAS message;

determining that the UE is in a connected state at a network side in response to receiving the initial NAS message or the N2 interface message; and determining that a second RAN node serving the UE stored in a UE context has changed in response to the second RAN node being different from the first RAN node that sent the N2 interface message configured to forward the initial NAS message, and notifying the second RAN node to release the UE context and existing user plane connection for the UE;

wherein in response to the UE moving out of an RAN Paging area allocated by the second RAN node and enters a coverage area of the first RAN node that does not support the UE staying in an RRC inactive state, the UE switches from a current Connection Management connected state to the Connection Management idle state; and in response to determining that an N2 connection between the second RAN node and the AMF not being released, the AMF determines that the UE is in the connected state.

2. The method of claim 1, wherein receiving the initial NAS message sent by the UE in the idle state, comprises:
receiving a registration update request message sent by the UE in the Connection Management idle state; or
receiving a request message of the UE when the UE sends uplink data in the idle state.

3. The method of claim 1, wherein determining that the UE is in the connected state at the network side, comprises:
determining that the UE is in the connected state at the network side according to the UE context.

4. The method of claim 1, wherein notifying the second RAN node to release the UE context and user plane connection, comprises:
notifying the second RAN node to release the UE context; deleting the user plane connection to a core network.

5. The method of claim 1, wherein determining that the second RAN node serving the UE has changed, and notifying the second RAN node to release the UE context and user plane connection, further comprises:
requesting a Session Management Function, SMF, to deactivate a Protocol Data Unit, PDU, session, where the request is used to request the SMF to deactivate the user plane connection, and make the SMF deletes user plane configuration for the PDU session.

6. The method of claim 1, wherein after receiving the initial NAS message sent by the UE or the N2 interface message sent by the first RAN node, the method further comprises:
determining that the UE enters a non-allowed area or forbidden area, and notifying a Session Management Function, SMF serving a PDU session with user plane connection that only regulatory prioritized services is reachable.

7. The method of claim 2, wherein when a service request message of the UE is received, the method further comprises:
requesting a Session Management Function, SMF to deactivate a PDU session; and then reactivate the PDU session according to the PDU session specified in the service request message.

8. A device for processing status mismatch between a User Equipment, UE, and a network, wherein the device comprises a memory configured to store a computer readable program, and a processor, wherein the processor is configured to read the computer-readable program to perform following method steps:
receiving an initial non-access stratum, NAS, message sent by the UE in a Connection Management idle state, or
receiving an N2 interface message, sent by a first Radio Access Network, RAN, node, and configured to forward the initial NAS message;
determining that the UE is in a connected state at a network side in response to receiving the initial NAS message or the N2 interface message; and
determining that a second RAN node serving the UE stored in a UE context has changed in response to the second RAN node being different from the first RAN node that sent the N2 interface message configured to forward the initial NAS message, and notifying the second RAN node to release the UE context and existing user plane connection for the UE;
wherein in response to the UE moving out of an RAN Paging area allocated by the second RAN node and entering a coverage area of the first RAN node that does not support the UE staying in an RRC inactive state, the UE switches from a current Connection Management connected state to the Connection Management idle state; and
in response to an N2 connection between the second RAN node and the AMF not being released, the AMF determines that the UE is in the connected state.

9. The device of claim 8, wherein the processor is configured to read the computer-readable program to:
receive a registration update request message sent by the UE in the Connection Management idle state; or
receive a request message of the UE when the UE sends uplink data in the idle state.

10. The device of claim 8, wherein the processor is configured to read the computer-readable program to:
determine that the UE is in the connected state at the network side according to the UE context.

11. The device of claim 8, wherein the processor is configured to read the computer-readable program to:
notify the second RAN node to release the UE context; delete the user plane connection to a core network.

12. The device of claim 8, wherein the processor is configured to read the computer-readable program to:
request a Session Management Function, SMF, to deactivate a Protocol Data Unit, PDU, session, where the request is used to request the SMF to deactivate the user plane connection, and make the SMF deletes user plane configuration for the PDU session.

13. The device of claim 8, wherein after receiving the initial NAS message sent by the UE or the N2 interface message sent by the first RAN node, the processor is configured to read the computer-readable program to:
determine that the UE enters a non-allowed area or forbidden area, and notify a Session Management Function, SMF serving a PDU session with user plane connection that only regulatory prioritized services is reachable.

14. A non-transitory computer readable storage medium storing a computer program thereon, wherein the computer program, when executed by a processor, implements the method of claim 1.

* * * * *